(12) United States Patent
Stojanovski (10) Patent No.: US 10,800,059 B2
(45) Date of Patent: Oct. 13, 2020

(54) PIZZA PAN WITH PRECISE CUTTING GUIDELINES

(71) Applicant: Dimitrije Stojanovski, Shelby Township, MI (US)

(72) Inventor: Dimitrije Stojanovski, Shelby Township, MI (US)

(*) Notice: Subject to any disclaimer, the term of this patent is extended or adjusted under 35 U.S.C. 154(b) by 930 days.

(21) Appl. No.: 15/078,460

(22) Filed: Mar. 23, 2016

(65) Prior Publication Data

US 2017/0274546 A1 Sep. 28, 2017

(51) Int. Cl.
*B26B 29/06* (2006.01)
*A47J 37/01* (2006.01)
*A47J 47/00* (2006.01)
*B26D 3/24* (2006.01)

(52) U.S. Cl.
CPC ............ *B26B 29/063* (2013.01); *A47J 37/01* (2013.01); *A47J 47/005* (2013.01); *B26D 3/24* (2013.01)

(58) Field of Classification Search
CPC ....... B26B 29/063; B26B 5/008; B26B 29/06; B26B 3/04; A47J 37/01; A47J 47/005; A47J 27/022; A47J 36/027; A47J 37/10; A47J 27/04; A47J 36/34; A47J 37/067; A47J 37/0694; A47J 37/0713; A47J 43/288; A47J 9/00
USPC ... 99/450, 432, 448, 426, 279, 39, 343, 352, 99/367, 400, 401, 416, 425, 428, 446, 99/447, 451, 537
See application file for complete search history.

(56) References Cited

U.S. PATENT DOCUMENTS

| | | | |
|---|---|---|---|
| 1,936,551 A | 11/1933 | Garrison | |
| 2,085,220 A | 6/1937 | Howlett | |
| 3,302,632 A | 2/1967 | Fichtner | |
| 3,799,048 A | 3/1974 | Finley | |
| 4,100,676 A | 7/1978 | Ferguson | |
| 5,117,078 A | 5/1992 | Beckett | |
| 5,363,750 A | 11/1994 | Miller et al. | |
| 6,035,766 A | 3/2000 | Schirmer | |
| 6,813,994 B2 | 11/2004 | Williams | |
| D596,894 S | 7/2009 | Cheng | |
| D657,209 S | 4/2012 | Getzinger et al. | |
| 9,198,437 B2 | 12/2015 | Ventimeglia et al. | |
| 2004/0134358 A1 | 7/2004 | Hopkins | |
| 2004/0250667 A1* | 12/2004 | Atwater | A21C 11/106 83/13 |
| 2006/0027106 A1 | 2/2006 | Craig et al. | |
| 2006/0180031 A1* | 8/2006 | Carlson | A21C 15/04 99/352 |
| 2007/0169636 A1 | 7/2007 | Carlson et al. | |

(Continued)

FOREIGN PATENT DOCUMENTS

DE 102011111793 A 3/2013
EP 2284099 2/2011

*Primary Examiner* — Serkan Akar
*Assistant Examiner* — Chris Q Liu
(74) *Attorney, Agent, or Firm* — Quinn IP Law (57) ABSTRACT

A pizza pan is disclosed including guidelines configured to aid in precisely cutting a pizza into slices with desired shapes. The pizza pan includes a flat base, vertical walls surrounding the flat base, a plurality of guidelines formed upon the flat base, and for each of the guidelines, a visible guideline locator situated upon one of the walls proximate to the guideline. The guidelines are configured to receive and guide a sharpened edge of a round pizza cutting tool as the tool cuts the pizza.

2 Claims, 11 Drawing Sheets

(56) References Cited

U.S. PATENT DOCUMENTS

2008/0202977 A1  8/2008  Knudsen et al.
2010/0282457 A1  11/2010 Li
2013/0036882 A1  2/2013  Getzinger et al.
2015/0366401 A1  12/2015 Baldwin

* cited by examiner

PIZZA PAN WITH PRECISE CUTTING GUIDELINES

TECHNICAL FIELD

This disclosure is related to a pan for cooking pizza, particularly to a pizza pan with guidelines facilitating precise cutting of the pizza.

BACKGROUND

The statements in this section merely provide background information related to the present disclosure. Accordingly, such statements are not intended to constitute an admission of prior art.

Pizza is cooked by placing rolled out pizza dough into a pan, applying toppings, and cooking the pizza in an oven. Once cooked, one uses a rolling pizza cutter to cut through the toppings and the dough. Precisely cutting a pizza can be difficult for an untrained worker.

SUMMARY

A pizza pan is disclosed including guidelines configured to aid in precisely cutting a pizza into slices with desired shapes. The pizza pan includes a flat base, vertical walls surrounding the flat base, a plurality of guidelines formed upon the flat base, and for each of the guidelines, a visible guideline locator situated upon one of the walls proximate to the guideline. The guidelines are configured to receive and guide a sharpened edge of a round pizza cutting tool as the tool cuts the pizza.

BRIEF DESCRIPTION OF THE DRAWINGS

One or more embodiments will now be described, by way of example, with reference to the accompanying drawings, in which:

FIGS. 13-17 illustrate exemplary pizza pans similar to the pizza pan of FIG. 1, with different pan profiles each including guidelines formed in a flat base of the pan and visible guideline locators on walls of the pan, in accordance with the present disclosure;

FIGS. 18-21 illustrate exemplary profiles for guidelines, in accordance with the present disclosure;

FIG. 18 illustrates the guideline of FIG. 1 in profile;

FIG. 19 illustrates the guideline of FIG. 3 in profile;

DETAILED DESCRIPTION

A pizza pan configuration is disclosed including guidelines configured to aid in guiding a pizza cutter to precisely cut a pizza. Visible guideline locators are provided upon the pan, providing a user with an ability to easily locate a pizza cutter to guidelines located under the pizza.

Figure 1:
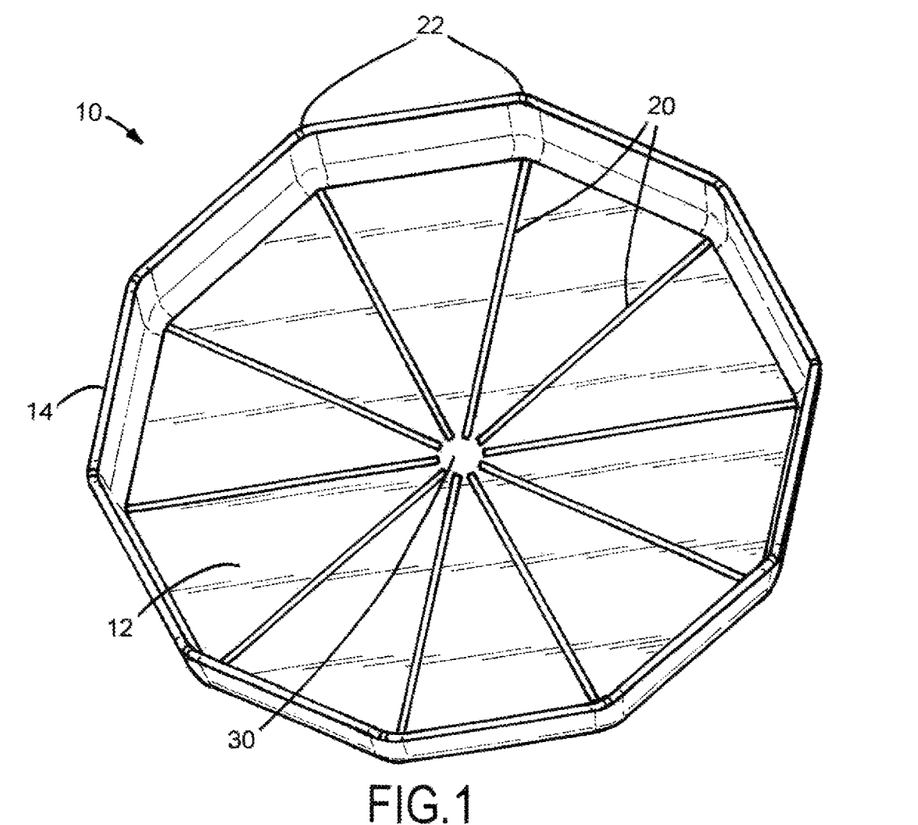
FIG. 1 illustrates an exemplary pizza pan including guidelines formed in a flat base of the pan and visible guideline locators on walls of the pan, the guidelines including through slots in the flat base, in accordance with the present disclosure.

Referring now to the drawings, wherein the showings are for the purpose of illustrating certain exemplary embodiments only and not for the purpose of limiting the same, FIG. 1 illustrates an exemplary pizza pan including guidelines formed in a flat base of the pan and visible guideline locators on walls of the pan, the guidelines including through slots in the flat base. Pizza pan 10 is illustrated including a flat base 12 and raised walls 14 around a perimeter of the pan. Guidelines 20 are illustrated extending outwardly radially from a center of the pan. In the embodiment of FIG. 1, guidelines 20 are through slots cut into, stamped from, or otherwise formed in flat base 12. In the center of the pan, the slots of guidelines 20 stop at a set radius from the center of the pan. If the slots were cut all the way through the center of the pan, the pan would be weakened, and triangular shaped panels of the pan not joined at the center of the pan would quickly bend and deform. By ceasing the slots of guidelines at a set radius from the center of pan 10, joining center 30 is formed, stabilizing pan 10 and joining the triangular portions of flat base 12. Visible guideline locators 22 are illustrated, one atop wall 14 above each end of a guideline 20. A user can use the guideline locators 22 to put a rolling pizza cutter into each of the guideline locators 22 and cut through the pizza. By doing so, the pizza cutter will be easily lined up to the guidelines 20 under the pizza. As the pizza cutter engages with the guidelines 20 and cuts through the pizza toward the center of the pan, the guidelines 20 keep the pizza cutter in precise alignment, forming pizza slices in the shapes of the guidelines formed upon pan 10.

In an alternative embodiment, visible guideline locators can be a mark upon the wall providing a visible indication of where the guideline is located without physically guiding a pizza cutter to the guideline.

According to the embodiment of FIG. 1, a polygonal pizza pan can include guidelines extending from each of the angular wall junctions of the pan to a central guideline junction.

Figure 2:
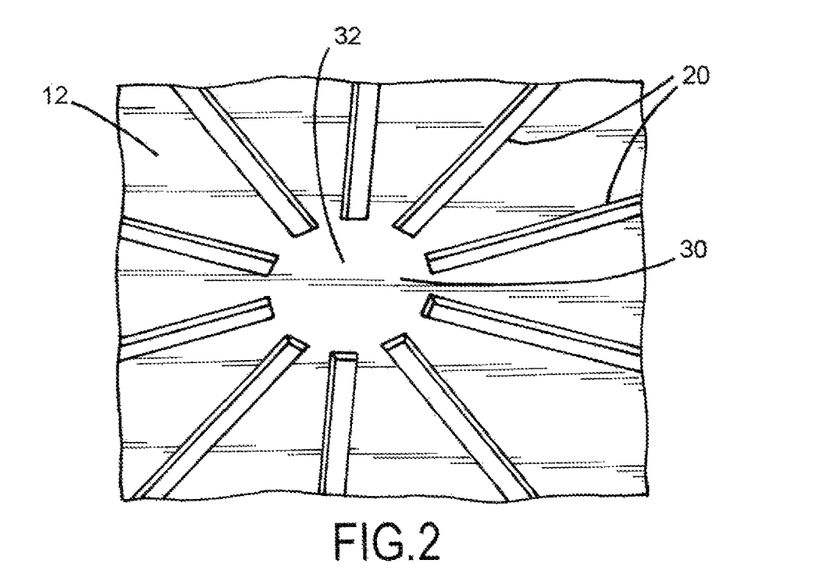
FIG. 2 illustrates the pizza pan of FIG. 1 in close up, illustrating a guideline joining center located at a center of the flat base, in accordance with the present disclosure.

FIG. 2 illustrates the pizza pan of FIG. 1 in close up, illustrating a guideline joining center located at a center of the flat base. Guidelines 20 embodied as through slots end at a set distance from a center 32 of the pan. Joining center 30 is formed, wherein no slots are cut in the pan material, and the pan material is joined at the center. Joining center 30 is small enough that a pizza cutter rolling out of the slots would only create insignificant differences in pizza slice geometries at the center of the pizza. Joining center 30 can have any diameter. Non-limiting exemplary diameters run from 2 inches to 0.75 inches in diameter.

The slots should be wide enough to accept a sharpened edge of a pizza cutter. Any exemplary width would be ⅛ of an inch.

Figure 3:
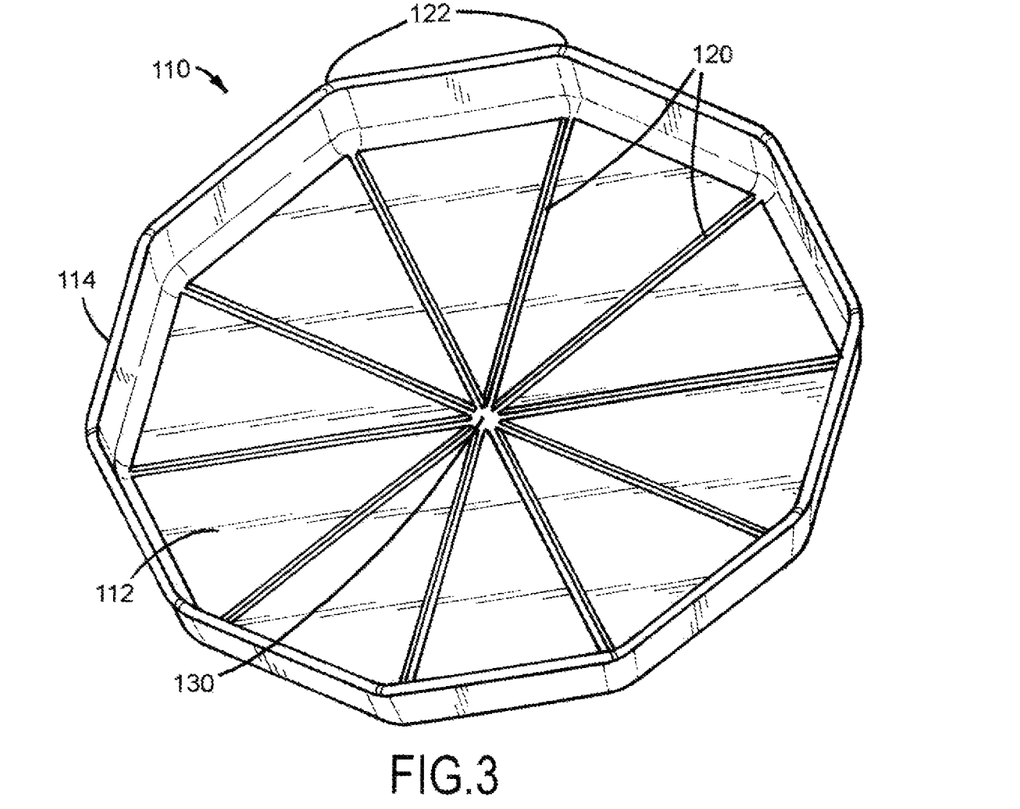
FIG. 3 illustrates an alternative exemplary pizza pan including guidelines formed in a flat base of the pan and visible guideline locators on walls of the pan, the guidelines including indented slots formed in the flat base, in accordance with the present disclosure.

FIG. 3 illustrates an alternative exemplary pizza pan including guidelines formed in a flat base of the pan and visible guideline locators on walls of the pan, the guidelines including indented slots formed in the flat base. Pizza pan 110 is illustrated including a flat base 112 and raised walls 114 around a perimeter of the pan. Guidelines 120 are illustrated extending outwardly radially from a center of the pan. In the embodiment of FIG. 3, guidelines 120 are indentations or slots not going entirely through the flat base 112. Guidelines 120 can be cut into, pressed into, or otherwise formed in flat base 112. In the center of the pan, the slots of guidelines 120 run through and overlap at a center of the pan, forming an indented slot junction 130. Visible guideline locators 122 are illustrated, one atop wall 114 above each end of a guideline 120. A user can use the guideline locators 122 to put a rolling pizza cutter into each of the guideline locators 122 and cut through the pizza. By doing so, the pizza cutter will be easily lined up to the guidelines 120 under the pizza. As the pizza cutter engages with the guidelines 120 and cuts through the pizza toward the center of the pan, the guidelines 120 keep the pizza cutter in precise alignment, forming pizza slices in the shapes of the guidelines formed upon pan 110.

Figure 4:
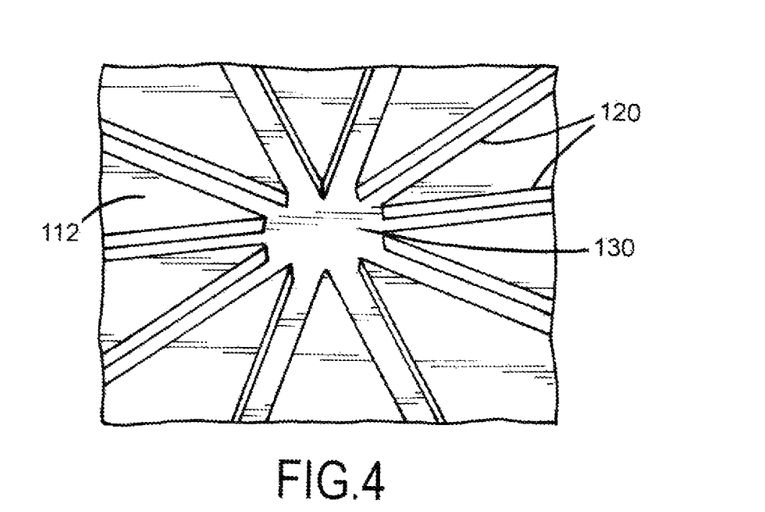
FIG. 4 illustrates the pizza pan of FIG. 3 in close up, illustrating an indented slot junction, in accordance with the present disclosure.

FIG. 4 illustrates the pizza pan of FIG. 3 in close up, illustrating an indented slot junction. Guidelines 120 embodied as indentations pressed or cut into pan 110. Indented slot junction 130 is formed, wherein the indented slots forming guidelines 120 overlap.

The indented slots should be wide enough to accept a sharpened edge of a pizza cutter. Any exemplary width would be ⅛ of an inch.

Figure 5:
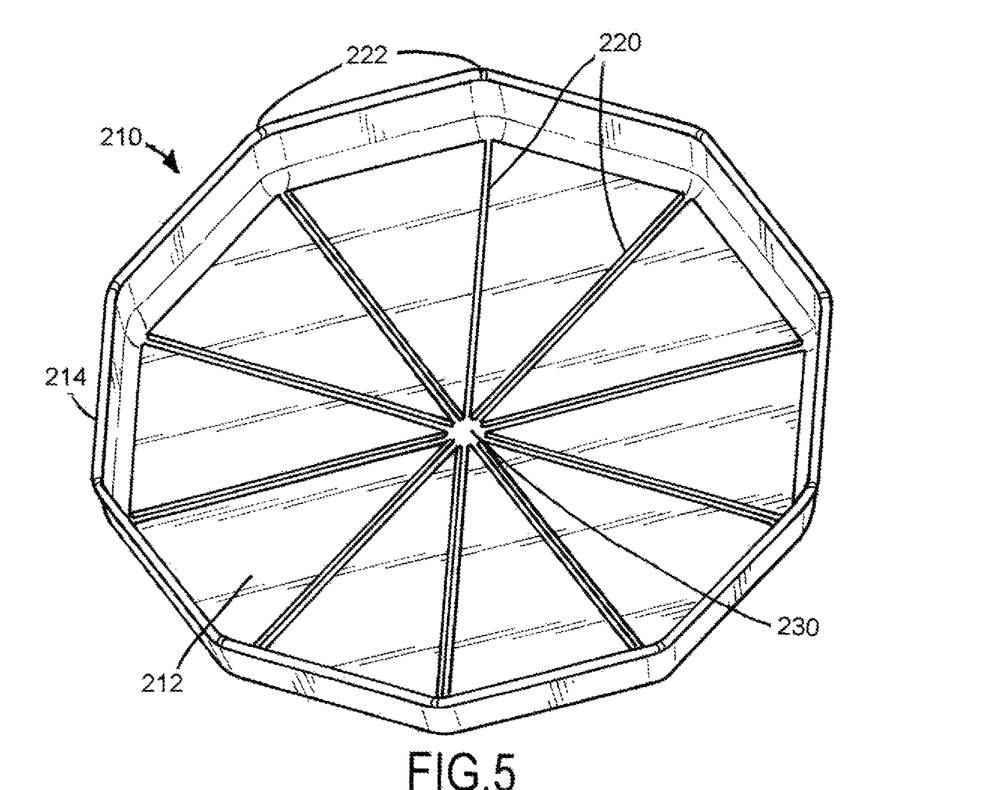
FIG. 5 illustrates an alternative exemplary pizza pan including guidelines formed in a flat base of the pan and visible guideline locators on walls of the pan, the guidelines including through slots in the flat base and a reinforced slot junction in a center of the pan, in accordance with the present disclosure.

FIG. 5 illustrates an alternative exemplary pizza pan including guidelines formed in a flat base of the pan and visible guideline locators on walls of the pan, the guidelines including through slots in the flat base and a reinforced slot junction in a center of the pan. Pizza pan 210 is illustrated including a flat base 212 and raised walls 214 around a perimeter of the pan. Guidelines 220 are illustrated extending outwardly radially from a center of the pan. In the embodiment of FIG. 5, guidelines 220 are through slots cut into, stamped from, or otherwise formed in flat base 212. In the center of the pan, the slots of guidelines 220 overlap through a center of the pan. Reinforced slot junction 230 is illustrated including the slots of the guidelines 220 overlapping and with additional material added or formed upon an underside of the pan joining the triangular sections of the pan together.

Figure 6:
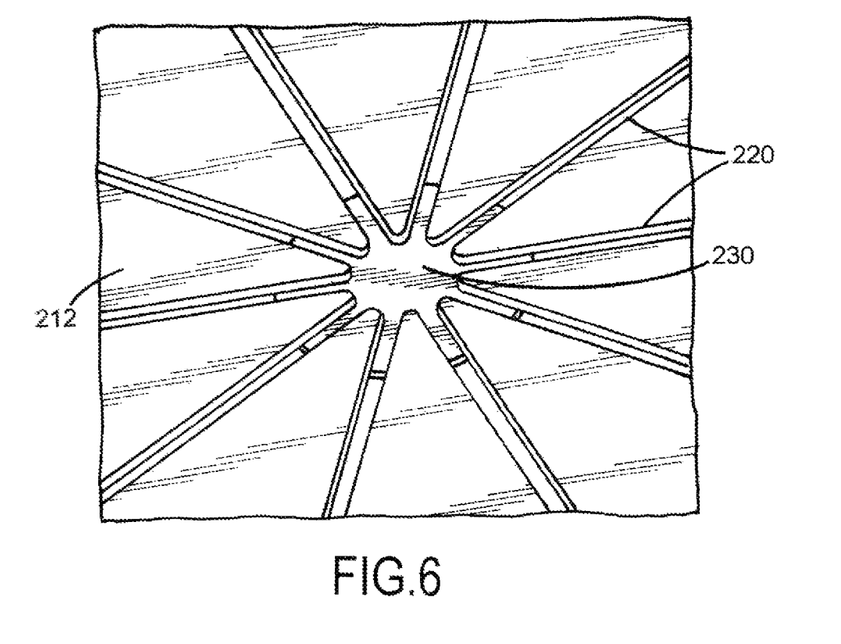
FIG. 6 illustrates the pizza pan of FIG. 5 in close up, illustrating the reinforced slot junction in detail, in accordance with the present disclosure.

FIG. 6 illustrates the pizza pan of FIG. 5 in close up, illustrating the reinforced slot junction in detail. Guidelines 220 embodied as through slots cut or formed into pan 210. Reinforced slot junction 230 is formed, wherein the indented slots forming guidelines 220 overlap.

Figure 7:
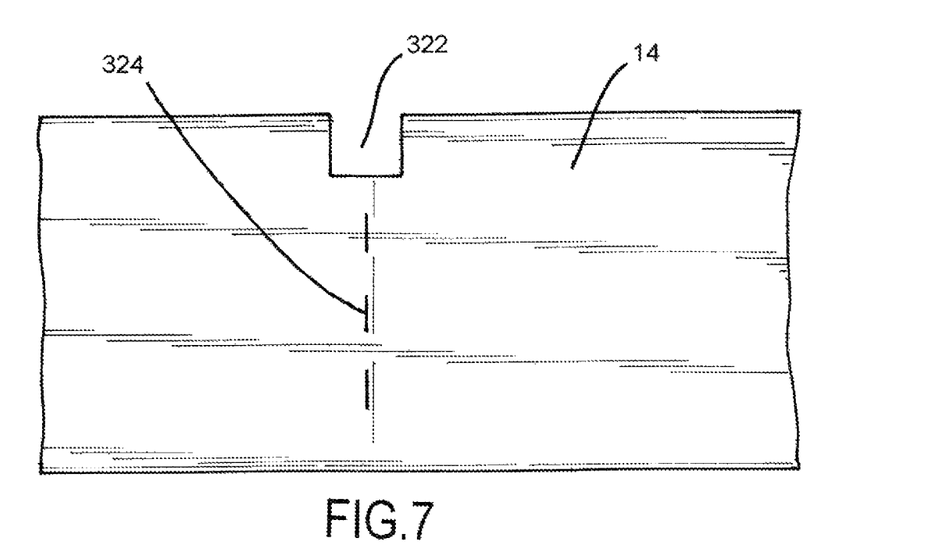
FIG. 7 illustrates the pizza pan of FIG. 1 including an exemplary visible guideline locator on a wall of the pan, the visible guideline locator including a cut out notch, in accordance with the present disclosure.

FIG. 7 illustrates the pizza pan of FIG. 1 including an exemplary visible guideline locator on a wall of the pan, the visible guideline locator including a cut out notch. Wall 14 is illustrated including bend 324 forming an angle in the perimeter of the pan. Notch 322 is illustrated, configured to accept a sharpened edge of a pizza cutter, aligning the pizza cutter with a guideline 20 formed in the pan just below notch 322.

Figure 8:
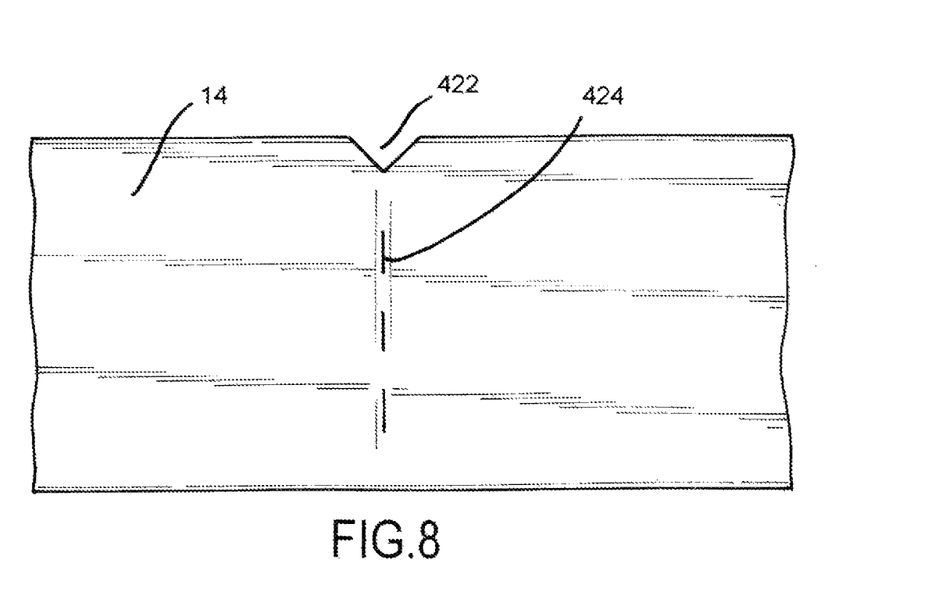
FIG. 8 illustrates the pizza pan of FIG. 1 including an exemplary visible guideline locator on a wall of the pan, the visible guideline locator including a V-shaped indentation, in accordance with the present disclosure.

FIG. 8 illustrates the pizza pan of FIG. 1 including an exemplary visible guideline locator on a wall of the pan, the visible guideline locator including a V-shaped indentation. Wall 14 is illustrated including bend 424 forming an angle in the perimeter of the pan. V-shaped indentation 422 is illustrated, configured to accept a sharpened edge of a pizza cutter, aligning the pizza cutter with a guideline 20 formed in the pan just below indentation 422.

Figure 9:
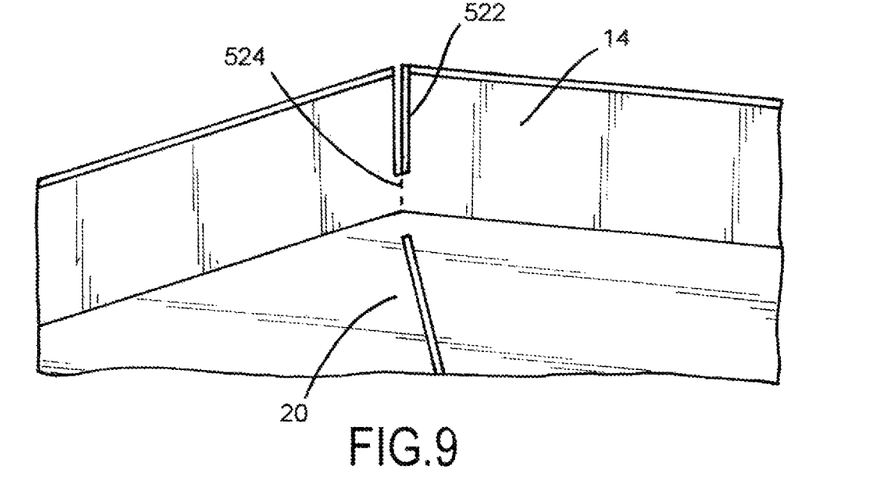
FIG. 9 illustrates the pizza pan of FIG. 1 including an exemplary visible guideline locator on a wall of the pan, the visible guideline locator including a slot extending down a majority of the wall, in accordance with the present disclosure.

FIG. 9 illustrates the pizza pan of FIG. 1 including an exemplary visible guideline locator on a wall of the pan, the visible guideline locator including a slot extending down a majority of the wall. Wall 14 is illustrated including bend 524 forming an angle in the perimeter of the pan. Slot 522 is illustrated, configured to accept a sharpened edge of a pizza cutter, aligning the pizza cutter with a guideline 20 formed in the pan just below slot 522. Slot 522, in extending down a majority of the wall, enables one to cut through a significant portion of the side crust of the pizza, with the pizza cutter unable to cut only a small portion of the pizza crust between slot 522 and guideline 20.

Figure 10:
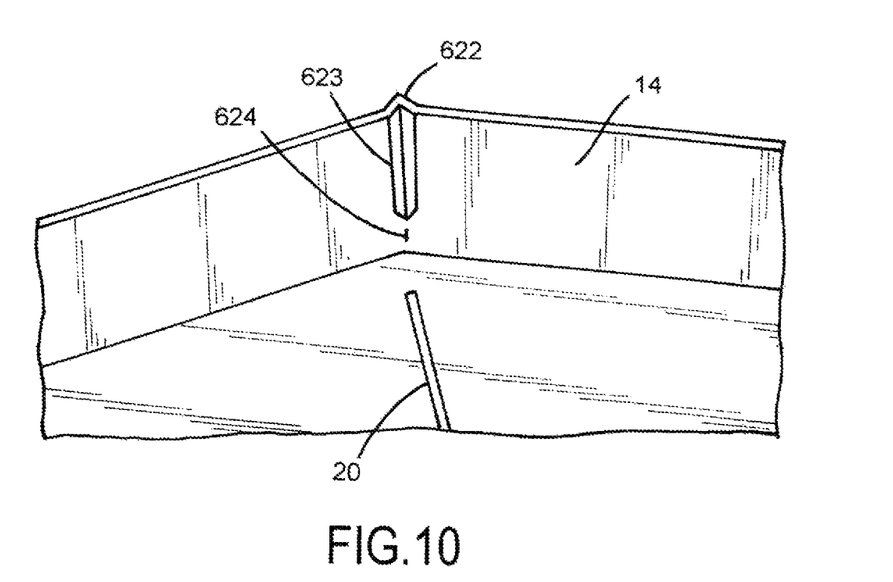
FIG. 10 illustrates the pizza pan of FIG. 1 including an exemplary visible guideline locator on a wall of the pan, the visible guideline locator including an indentation extending down a majority of the wall, in accordance with the present disclosure.

FIG. 10 illustrates the pizza pan of FIG. 1 including an exemplary visible guideline locator on a wall of the pan, the visible guideline locator including an indentation extending down a majority of the wall. Wall 14 is illustrated including bend 624 forming an angle in the perimeter of the pan. Indentation 623 is illustrated, configured to accept a sharpened edge of a pizza cutter, aligning the pizza cutter with a guideline 20 formed in the pan just below indentation 623. Indentation 623 includes a V-shaped notch 622 formed in a top of wall 14.

Figure 11:
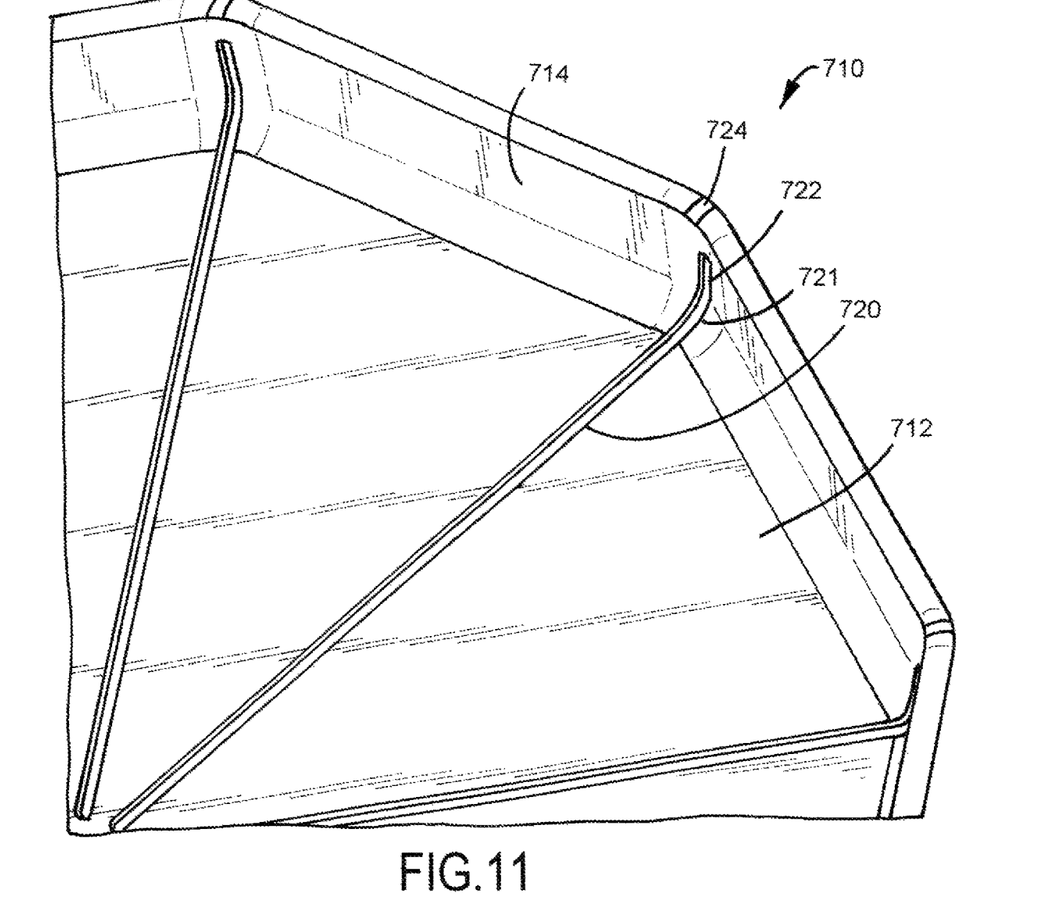
FIG. 11 illustrates an exemplary alternative pizza pan including guidelines formed in a flat base of the pan and visible guideline locators on walls of the pan, the guidelines including through slots in the flat base where the guidelines extend up the walls and the ends of the slots extend high enough to form the visible guideline locators, in accordance with the present disclosure.

FIG. 11 illustrates an exemplary alternative pizza pan including guidelines formed in a flat base of the pan and visible guideline locators on walls of the pan, the guidelines including through slots in the flat base where the guidelines extend up the walls and the ends of the slots extend high enough to form the visible guideline locators. Pizza pan 710 is illustrated including a flat base 712 and walls 714. Guidelines 720 are illustrated a through slots cut into flat base 712. Guidelines 720 extend up walls 714, including rounded section 721 and vertical section 722. An end of vertical section 722 can be high enough on the wall to be visible to the user, thereby serving as the visible guideline locator for the pan. In one embodiment, no other visible notch or indentation is formed on wall 714. In the embodiment of FIG. 11, additional notches 724 are located atop wall 714 above guidelines 720 to further aid the user in correctly locating the pizza cutter to the pan.

Figure 12:
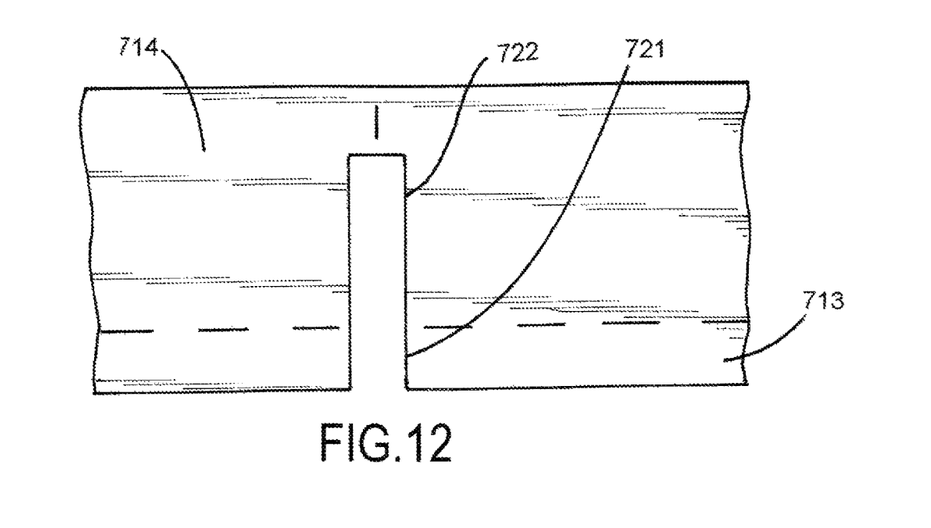
FIG. 12 illustrates the pizza pan of FIG. 11, illustrating in close up detail the slots extending up the wall of the pan, in accordance with the present disclosure.

FIG. 12 illustrates the pizza pan of FIG. 11, illustrating in close up detail the slots extending up the wall of the pan. Wall 714 is illustrated including a rounded wall base 713, transitioning wall 174 with a flat base. In another embodiment wall 174 can include a substantially right angle transition with a flat base, and a slot could similarly be cut across the transition, extending from the flat base up the wall. In FIG. 12, rounded section 721 and vertical section 722 of the guideline extending up wall 714 are illustrated.

A number of different guideline configurations are disclosed herein. A number of different visible guideline locators are disclosed herein. It will be appreciated that various different guidelines and visible guideline locators can be interchangeably used upon a pizza pan in accordance with the pizza pan of the disclosure, and the disclosure is not intended to be limited to the particular combinations illustrated in the figures.

FIGS. 13-17 illustrate exemplary pizza pans similar to the pizza pan of FIG. 1, with different pan profiles each including guidelines formed in a flat base of the pan and visible guideline locators on walls of the pan. Any combination of guideline and visible guideline locator features disclosed or contemplated herein can be used upon the pans of FIGS. 13-17.

Figure 13:
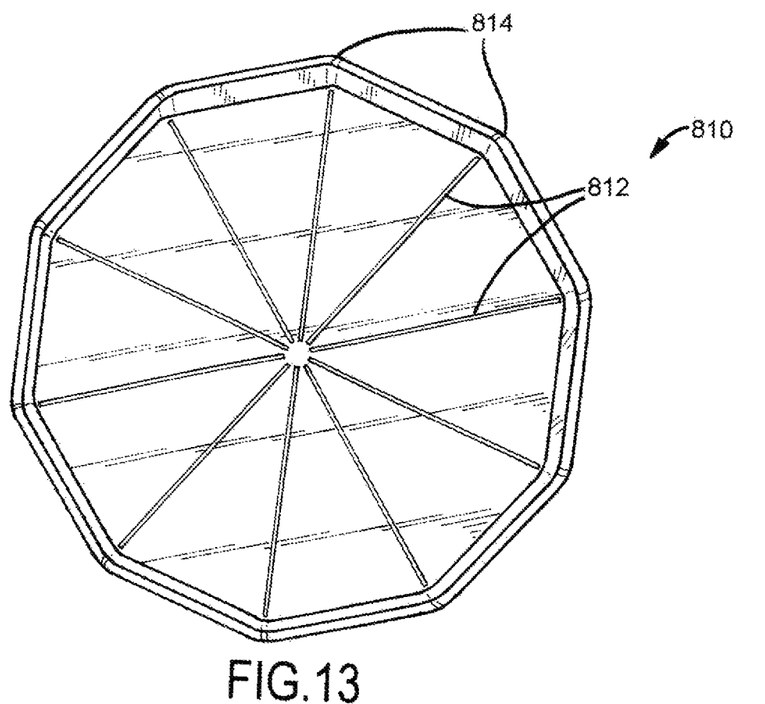
FIG. 13 illustrates a pan in the form of a decagon.

FIG. 13 illustrates a pan in the form of a decagon. Pizza pan 810 is illustrated, including guidelines 812 and visible guideline locators 814. Any polygon, including five, six, ten or twelve sides can be used to form a pizza pan in accordance with the present disclosure, and the disclosure is not intended to be limited to the particular configurations illustrated in the figures.

Figure 14:
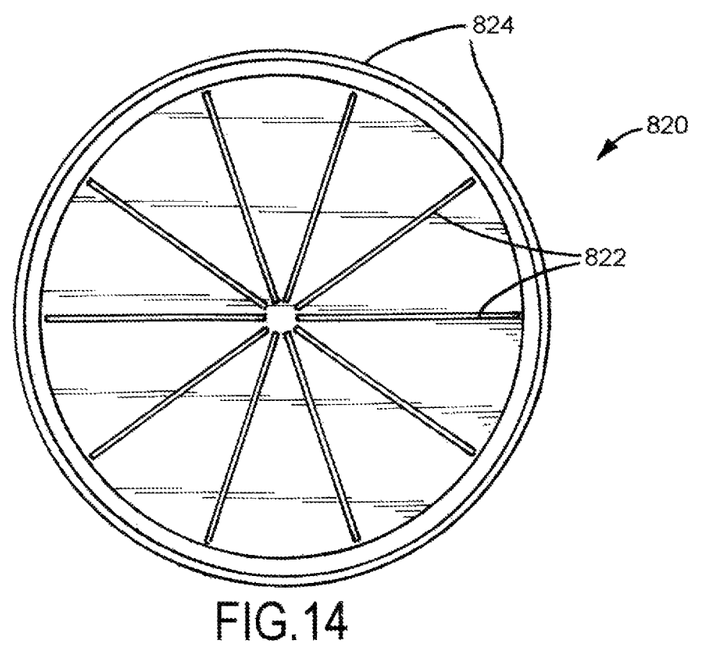
FIG. 14 illustrates a pan in the form of a circle.

FIG. 14 illustrates a pan in the form of a circle. Pizza pan 820 is illustrated including guidelines 822 and visible guideline locators 824.

Figure 15:
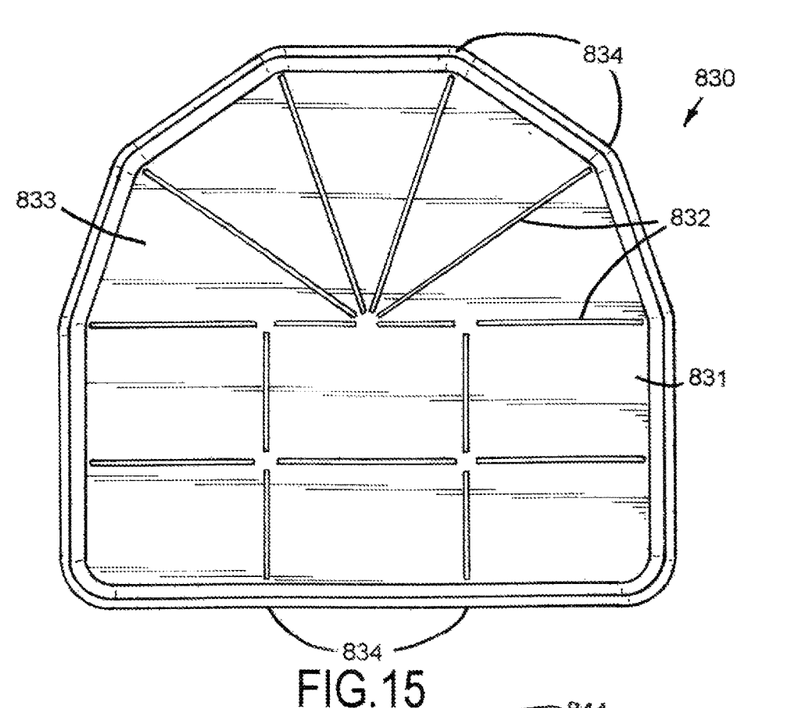
FIG. 15 illustrates a pan with a rectangular portion and a half of a decagon portion.

FIG. 15 illustrates a pan with a rectangular portion and a half of a decagon portion. Pizza pan 830 is illustrated including half decagon portion 833, rectangular portion 831, guidelines 832, and visible guideline locators 834. Instead of having one center of the pan at which the guidelines converge, the rectangular portion includes a number of regions at which the guidelines converge and the pan material is connected to maintain stability of the pan. Portion 833 can be replaced by a portion of any polygon, for example, including half of a square cut diagonally, half of a pentagon, hexagon, hendecagon (having eleven sides), or dodecagon (having twelve sides.) Likewise, rectangular portion 831 can be replaced by any polygon, for example, including a hemispherical half circle.

Figure 16:
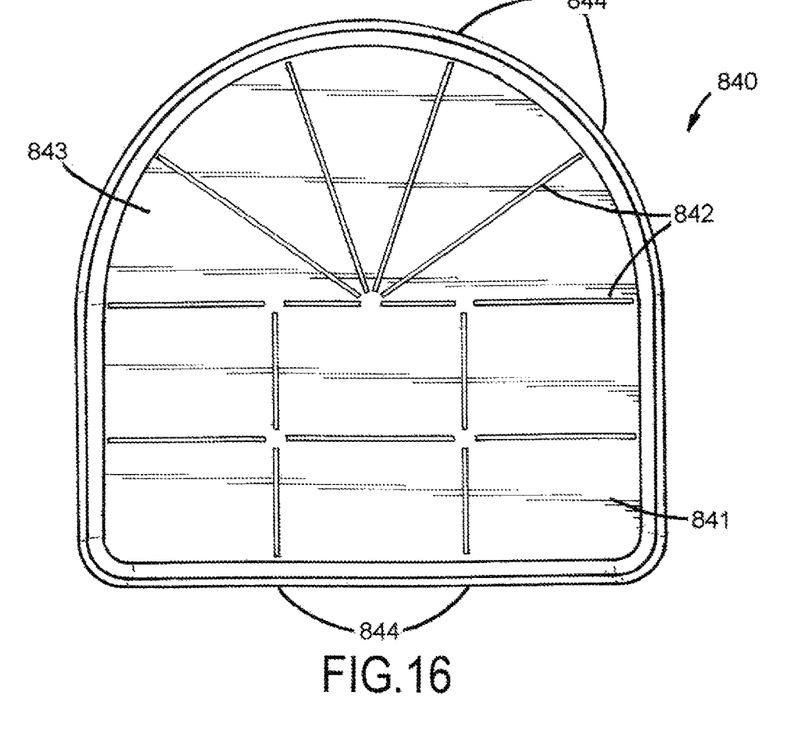
FIG. 16 illustrates a pan with a rectangular portion and a hemispherical portion.

FIG. 16 illustrates a pan with a rectangular portion and a hemispherical portion. Pizza pan 840 is illustrated including hemispherical portion 843, rectangular portion 841, guidelines 842, and visible guideline locators 844. Instead of having one center of the pan at which the guidelines converge, the rectangular portion includes a number of regions at which the guidelines converge and the pan material is connected to maintain stability of the pan.

Figure 17:
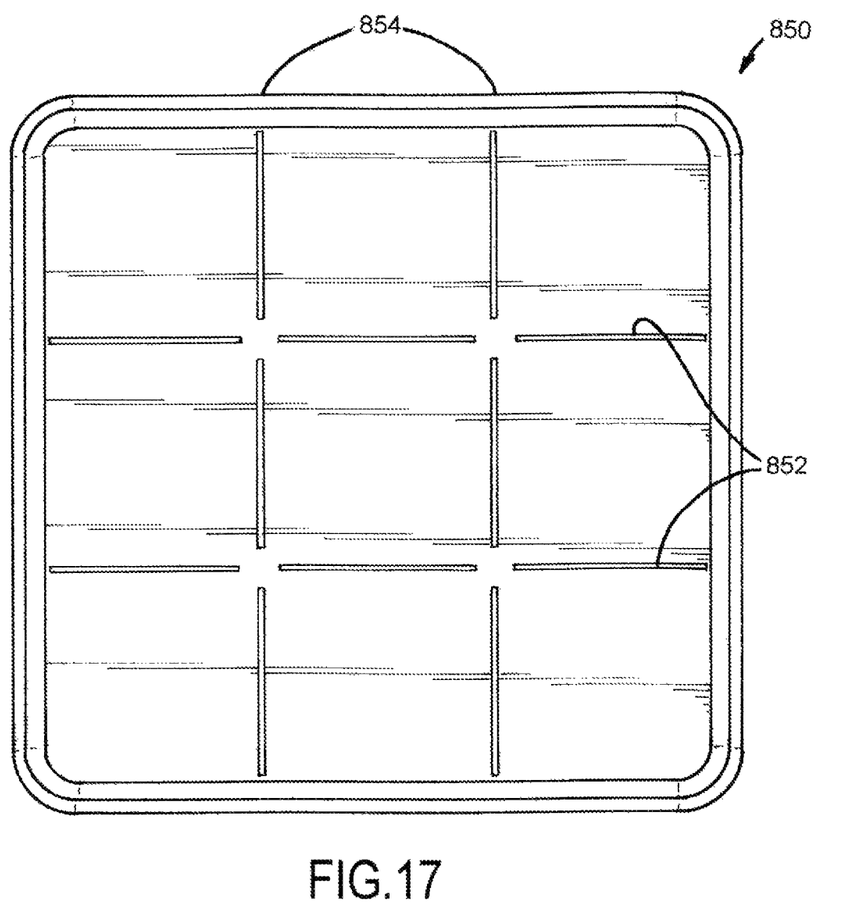
FIG. 17 illustrates a pan with a square profile.

FIG. 17 illustrates a pan with a square profile. Pizza pan 850 is illustrated including guidelines 852 and visible guideline locators 854. Instead of having one center of the pan at which the guidelines converge, the rectangular pan includes a number of regions at which the guidelines converge and the pan material is connected to maintain stability of the pan. According to the embodiment of FIG. 17, a polygonal pizza pan can include guidelines extending from midpoints of walls of the pan to a plurality of guideline junctions.

Figure 18:
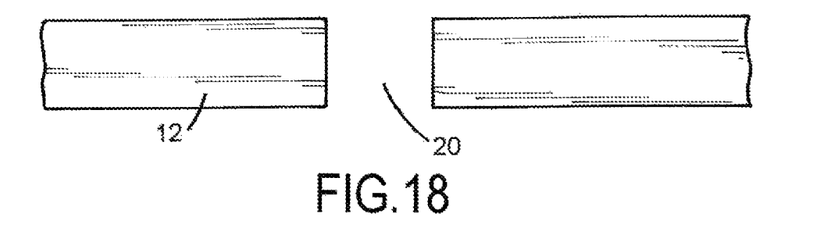

FIG. 18 illustrates the guideline of FIG. 1 in profile. Flat base 12 is illustrated showing guideline 20 embodied as a through slot 20. A through slot includes any slot providing an opening in the material of the pan. In this embodiment, the flat base material could be machined or punched away.

Figure 19:
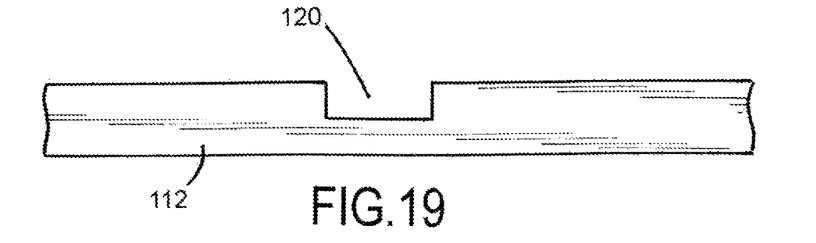

FIG. 19 illustrates the guideline of FIG. 3 in profile. Flat base 112 is illustrated showing guideline 120 as a slot not going entirely through flat base 112. In this example, the material of flat base 112 can be machined away to create the slot.

Figure 20:
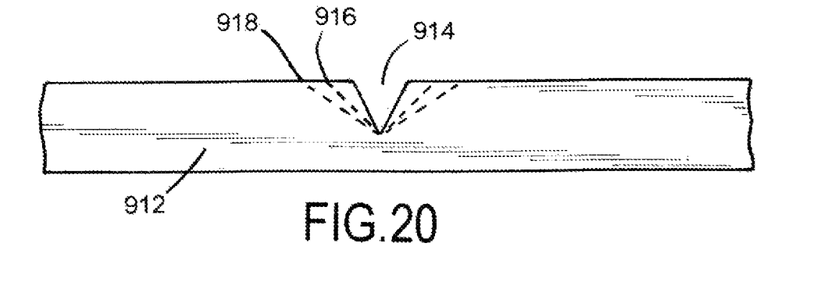
FIG. 20 illustrates an exemplary alternative guideline in profile including a machined V-shaped guideline.

FIG. 20 illustrates an exemplary alternative guideline in profile including a machined V-shaped guideline. Flat base 912 is illustrated showing guideline 914 including a V-shaped profile. Such a profile can be advantageous for providing a sharpened pizza cutter with a precise shape in which to seat, the sharpened edge of the cutter mating with the narrow end of the V-shaped slot. Lines 916 and 918 are illustrated showing different exemplary angles that can be used to create guideline 914.

Figure 21:
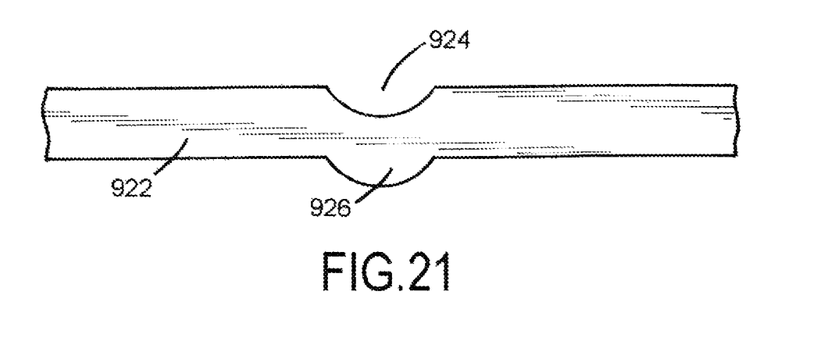
FIG. 21 illustrates an exemplary additional alternative guideline in profile including a pressed rounded guideline.

FIG. 21 illustrates an exemplary additional alternative guideline in profile including a pressed rounded guideline. Flat base 922 is illustrated including rounded guideline 924 pressed into the material of flat base 922. Material 926 of flat base 922 is displaced/protrudes from a bottom surface of flat base 922. Guideline 924 can, for example, be created in a single step with the pan being pressed into shape from a flat piece of metal.

Figure 22:
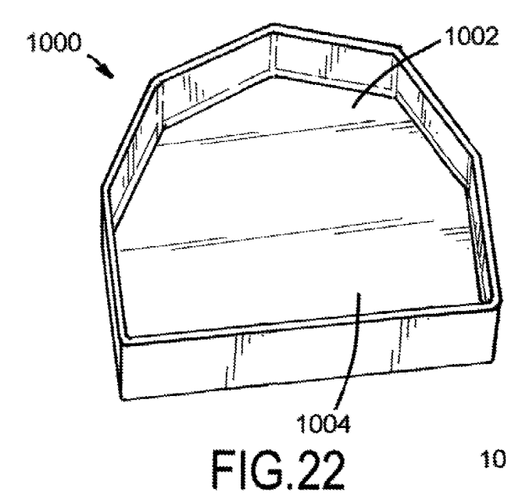
FIG. 22 illustrates an exemplary pizza pan including a rectangular portion and a half of an octagon portion, in accordance with the present disclosure.

FIG. 22 illustrates an exemplary pizza pan including a rectangular portion and a half of an octagon portion. Even without guidelines provided with other embodiments of the disclosure, a pan with the outline of the pan of FIG. 22 can aid in precisely cutting a pizza. The exemplary pan 1000 of FIG. 22 enables one to cut a plurality of rectangular pizza slices within the rectangular portion 1004 of the pan and a plurality of wedge shaped slices within half octagon portion 1002 of the pan. In one embodiment of the disclosure, a thickened wall section or thermally resistive plate can be inserted or provide between portion 1002 and the pizza crust, such that a thinner crust can be cooked in portion 1002 and a thicker crust can be cooked in portion 1004, with the increased thermal resistivity of portion 1002 allowing the thinner crust to cook relatively more slowly.

Figure 23:
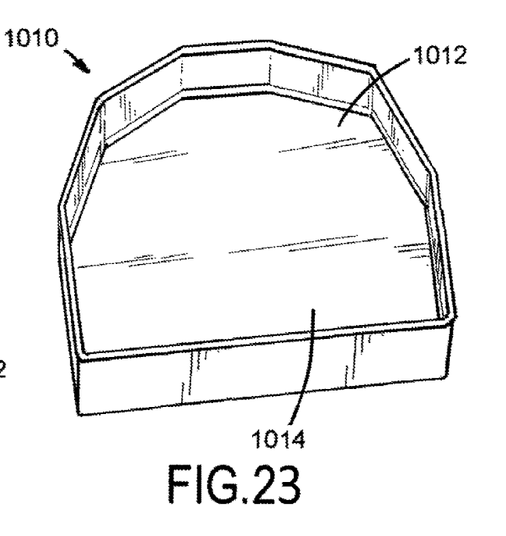
FIG. 23 illustrates an exemplary pizza pan including a rectangular portion and a half of a decagon portion, in accordance with the present disclosure.

FIG. 23 illustrates an exemplary pizza pan including a rectangular portion and a half of a decagon portion. The exemplary pan 1010 of FIG. 23 enables one to cut a plurality of rectangular pizza slices within the rectangular portion 1014 of the pan and a plurality of wedge shaped slices within half decagon portion 1012 of the pan.

Figure 24:
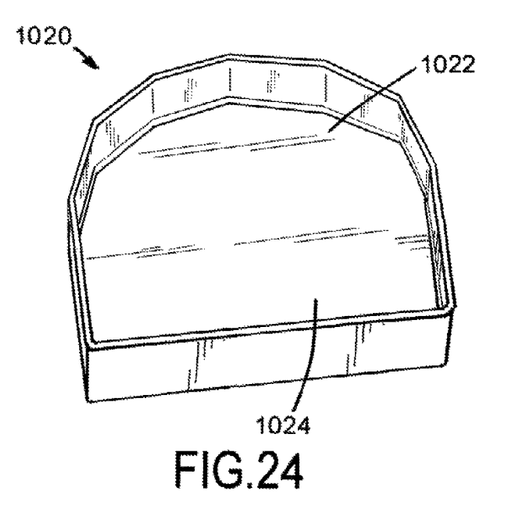
FIG. 24 illustrates an exemplary pizza pan including a rectangular portion and a half of a dodecagon portion, in accordance with the present disclosure.

FIG. 24 illustrates an exemplary pizza pan including a rectangular portion and a half of a dodecagon portion. The exemplary pan 1020 of FIG. 24 enables one to cut a plurality of rectangular pizza slices within the rectangular portion 1024 of the pan and a plurality of wedge shaped slices within half decagon portion 1022 of the pan. FIGS. 22-24 are intended as exemplary, with any of a number of other half and half shapes being envisioned in the pizza pan.F The disclosure has described certain preferred embodiments and modifications of those embodiments. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A device comprising:
a pizza pan including a plurality of guidelines configured to aid in precisely cutting a pizza into slices with desired shapes, the pizza pan further comprising:
a horizontal flat base;
a plurality of vertical walls surrounding and extending above the flat base, wherein the vertical walls extending above the flat base are operable to contain the pizza within the vertical walls;
the guidelines formed upon and limited to the flat base, the guidelines comprising indentations slots formed in the flat base, wherein the guidelines are operable to receive and guide a sharpened edge of a pizza cutting tool, which the guidelines cause to form pizza slices in shapes defined by the guidelines formed upon the pizza pan; and
a plurality of visible guideline locators, wherein each of the a plurality of visible guideline locators comprises a mark situated at a top of one of the vertical walls above each of the guidelines, wherein each of the visible guideline locators provide position of one of the guidelines, wherein the mark situated at the top of one of the vertical walls is configured to be visible and facilitate the pizza cutting tool to line up with the guidelines when the pizza is placed upon the horizontal flat base;
wherein the plurality of guidelines formed upon and limited to the flat base do not extend onto the vertical walls;
wherein the flat base defines an indented slot junction where the plurality of guidelines overlap.

2. The device of claim 1, wherein the flat base is configured as a polygonal shape having five or more sides.

* * * * *